US009225244B2

(12) United States Patent
Brudermann et al.

(10) Patent No.: US 9,225,244 B2
(45) Date of Patent: Dec. 29, 2015

(54) CIRCUIT ARRANGEMENT FOR REDUCING POWER LOSS IN THE CASE OF AN ACTIVE ELECTRICAL CURRENT OUTPUT OF A FIELD DEVICE

(71) Applicant: Endress + Hauser Flowtec AG, Maulburg (DE)

(72) Inventors: Matthias Brudermann, Meohlin (CH); Antoine Simon, St. Louis (FR); Nikolai Fink, Aesch (CH); Daniel Kollmer, Maulburg (DE); Ole Koudal, Oberrohrdorf (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/369,773

(22) PCT Filed: Nov. 22, 2012

(86) PCT No.: PCT/EP2012/073391
§ 371 (c)(1),
(2) Date: Jun. 30, 2014

(87) PCT Pub. No.: WO2013/097995
PCT Pub. Date: Jul. 4, 2013

(65) Prior Publication Data
US 2015/0002111 A1   Jan. 1, 2015

(30) Foreign Application Priority Data

Dec. 29, 2011  (DE) .......................... 10 2011 090 116
Jan. 5, 2012  (DE) .......................... 10 2012 200 105

(51) Int. Cl.
*H02M 3/156*  (2006.01)
*G01D 21/00*  (2006.01)
*G05B 19/042*  (2006.01)

(52) U.S. Cl.
CPC .............. *H02M 3/156* (2013.01); *G01D 21/00* (2013.01); *G05B 19/0423* (2013.01); *G05B 2219/21119* (2013.01); *G05B 2219/25428* (2013.01)

(58) Field of Classification Search
CPC ................ H02M 3/156–3/158; H02M 3/1588; H02M 2001/007; H02M 2001/0045; G05F 1/56; G05F 1/563; G05F 1/565; G05F 1/575
USPC ................................... 323/266, 274, 282–285
See application file for complete search history.

(56) References Cited

U.S. PATENT DOCUMENTS 4,359,674 A    11/1982  Gotou
6,087,815 A *   7/2000  Pfeifer et al. ................. 323/282
(Continued)

FOREIGN PATENT DOCUMENTS

DE         3006707        10/1980

OTHER PUBLICATIONS

German Search Report, German PTO, Munich, Jun. 8, 2012.
(Continued)

*Primary Examiner* — Adolf Berhane
*Assistant Examiner* — Yemane Mehari
(74) *Attorney, Agent, or Firm* — Bacon & Thomas, PLLC

(57) ABSTRACT

A circuit arrangement comprises a voltage regulator coupled to an external voltage supply and a control loop associated with the voltage regulator. The control loop includes an electrical current controller for setting the electrical current value, an analog-digital converter, a reference resistor and a computation/control unit coupled with the voltage regulator and the said analog-digital converter, and the control loop is so embodied that the voltage regulator, as a function of the presently set electrical current value, controls a voltage to an external load connected with the electrical current output. Particularly the computation/control unit is adapted to calculate a voltage to be delivered by the voltage regulator and to operate both, the electrical current controller and the voltage regulator for setting the electrical current value and to operate and for tuning the voltage delivered by the voltage regulator as a function of the presently set electrical current value, respectively.

16 Claims, 1 Drawing Sheet

(56) References Cited

U.S. PATENT DOCUMENTS 6,959,356 B2 * 10/2005 Packwood et al. ............ 710/315
2007/0152645 A1 7/2007 Orth

OTHER PUBLICATIONS

International Search Report, EPO, The Netherlands, Apr. 8, 2013.
English translation of the International Preliminary Report on Patentability, WIPO, Geneva, Nov. 22, 2012.

* cited by examiner

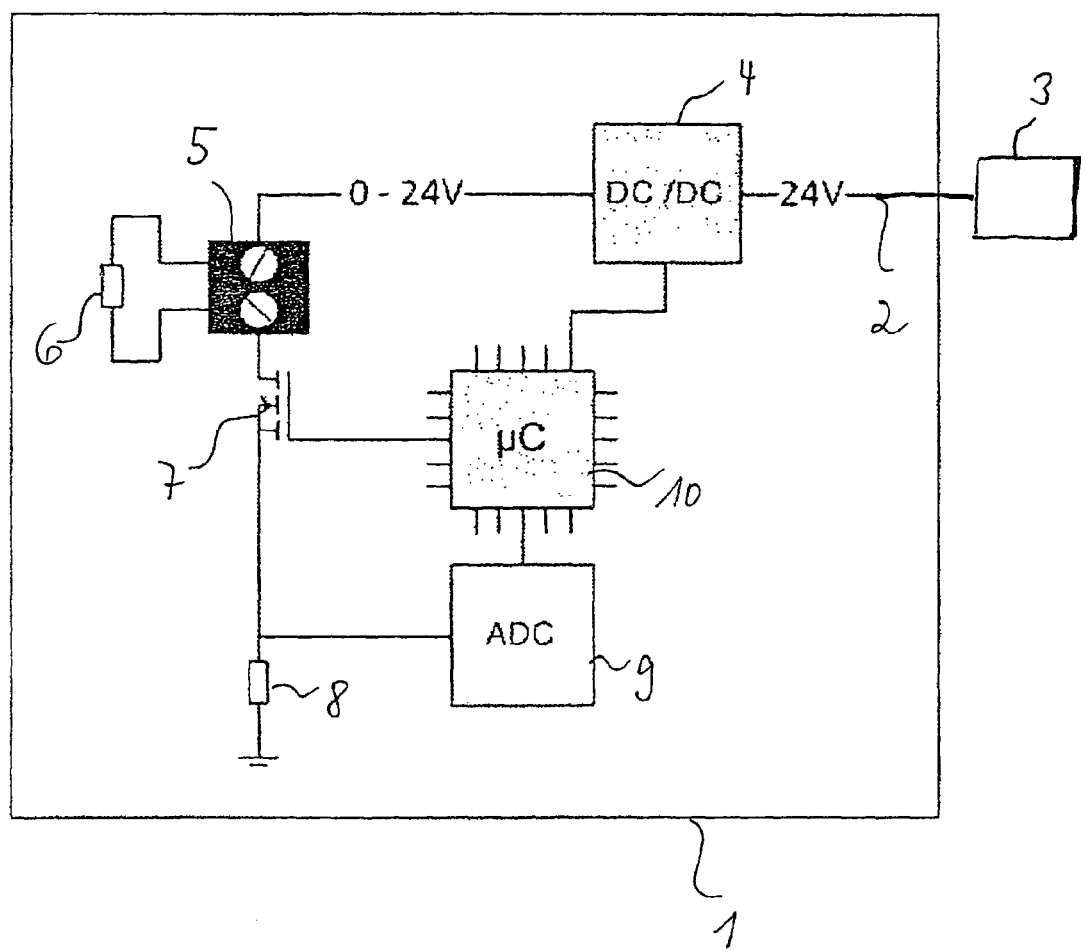

CIRCUIT ARRANGEMENT FOR REDUCING POWER LOSS IN THE CASE OF AN ACTIVE ELECTRICAL CURRENT OUTPUT OF A FIELD DEVICE

TECHNICAL FIELD

The invention relates to a circuit arrangement for reducing power loss in the case of an active electrical current output of a field device for determining and/or influencing a process variable, wherein the process variable is represented via a selectable electrical current value.

BACKGROUND DISCUSSION

In process automation technology, as well as in manufacturing automation technology, field devices are often applied, which serve for registering and/or influencing process variables. Serving for registering process variables are measuring devices, such as, for example, flow measuring devices, fill level measuring devices, pressure and temperature measuring devices, pH-measuring devices, conductivity measuring devices, etc., which register the corresponding process variables, flow, fill level, pressure, temperature, pH-value, and conductivity, respectively. Used for influencing process variables are actuators, such as valves or pumps, via which e.g. the flow of a liquid in a pipeline or the fill level of a medium in a container is changed. The terminology 'field devices' as used in connection with the invention includes, thus, all types of measuring devices and actuators. As used in connection with the invention, the terminology 'field devices' includes, moreover, all devices, which are applied near to the process and deliver, or process, process relevant information.

In the case of field devices applied in automation technology, electrical current outputs are used to provide signals representing the process variables registered by the field device. An electrical current output provides an interface between the field device and the environment. An electrical current output is unidirectional and enables communication from the field device to a peripheral device representing a load. The peripheral device is, for example, a data logger or a display unit, which is connected with the field device.

In the case of application of the 4-20 mA standard customary in automation technology, an electrical current value between 4 mA and 20 mA represents the process variable within a predetermined range of values of the process variable. For transmitting an alarm state, electrical current values below 4 mA, respectively above 20 mA, are used. In the case of four-conductor field devices, the electrical current outputs can be operated actively, and one speaks in this connection of active electrical current outputs. A four-conductor field device has usually an energy supply input equipped with two input lines for an external energy supply and an electrical current output with two output lines for carrying the measure for the process variable to be determined and/or influenced by the field device.

In the case of known electrical current outputs, the load is connected between a voltage source, which delivers a predetermined voltage, and an electrical current controller, which is connected via a resistor to a reference potential, especially ground. For example, the predetermined voltage of the voltage source amounts to 24 V. The electrical current controller is preferably a transistor, which can be, for example, an FET or a bipolar transistor. The electrical current controller must, as a function of the load connected to the electrical current output and as a function of the electrical current value to be set, convert the excess energy into power loss and therewith into heat. In the case of the known solution, usually a large part of the available energy is converted in the electrical current controller into power loss.

Due to miniaturization of field devices, the draining away of the heat arising from the destruction of the excess energy represents an increasing problem. The associated small housings are only limitedly able to expel the heat to the environment and this leads to an undesired temperature increase of the housings of the field devices. Added to this is the fact that the disposal of energy is viewed as a waste of energy and is increasingly less acceptable to customers.

SUMMARY OF THE INVENTION

An object of the invention is to provide a circuit arrangement, which reduces power loss in the case of an active electrical current output of a field device.

The object is achieved by features including that an external voltage supply, a voltage regulator and a control loop associated with the voltage regulator are provided. The control loop is so embodied that the voltage regulator, as a function of the presently set electrical current value, controls the voltage to an external load connected in parallel with the electrical current output in such a manner that the external load receives essentially only the respectively required voltage. In the limiting case, the control occurs in such a manner that the power loss at an electrical current controller, e.g. at a transistor, approaches zero.

In an embodiment, the control loop includes an electrical current controller, especially a transistor, for setting the electrical current value, an analog-digital converter, a computation/control unit and a reference resistor connected in series with the electrical current controller. The reference resistor is connected to a reference potential, especially to ground. Preferably, the analog-digital converter is so arranged that it measures the voltage on the reference resistor, digitizes the measured voltage and feeds the digitized voltage value to the computation/control unit.

The voltage regulator delivers in the ideal case an approximately correct pretuning of the voltage provided for the load. The electrical current controller cares for the fine tuning of the electrical current value, so that this reflects the correct value of the process variable. The circuit arrangement is so designed that the electrical current controller, which is preferably a transistor, only needs to destroy a very limited amount of energy, in order correctly to set the electrical current value corresponding to the process variable. In this way, the field device satisfies current environmental standards directed toward energy saving.

Since the above described solution of the invention is relatively calculation intensive, a further development provides that the control loop controls the voltage regulator in predetermined voltage steps. For example, ten voltage steps are provided for a range of 4-20 mA. This means that a tuning of the voltage delivered by the voltage regulator does not have to be made for each change of the electrical current value. Since always at least the voltage required for setting the electrical current value must be provided, there arises in the case of this stepwise tuning of the voltage, in given cases, excess power, which must be converted into power loss by the electrical current controller. However, the power loss corresponds to only a fraction of the power loss, which occurs in the case of the solution known from the state of the art, where there is no pretuning of the voltage.

An advantageous embodiment of the circuit arrangement of the invention provides that the computation/control unit, based on the respectively tuned voltage, respectively voltage step, and based on the present electrical current value, calculates the power required by the load and correspondingly operates the voltage regulator and the electrical current controller.

For reducing the power loss further, a voltage regulator of high efficiency is applied. The voltage regulator preferably comprises a DC/DC converter. This embodiment assures that the voltage regulator produces little power loss, when it converts the voltage provided by the voltage supply into a low voltage.

In an advantageous embodiment of the circuit arrangement of the invention, the control loop is so embodied that, for the case, in which a malfunction occurs, especially an overload (short circuit, as special case of overload) at the external load, an interruption of the electrical current supply (line break) to the external load or a wiring fault at the signal output of the field device, the voltage regulator turns the electrical current output off. In such case, the computation/control unit detects, for example, an overload by noting that the electrical current controller can no longer set an electrical current value corresponding to the process variable, although the voltage regulator is set to the maximum possible voltage or to the next higher voltage step. For checking whether a malfunction is present, it is no longer necessary to set the maximum available electrical current. Furthermore, it is provided that the field device outputs a corresponding warning report in the case of detecting a malfunction.

BRIEF DESCRIPTION OF THE DRAWINGS

The invention will now be explained in greater detail based on the drawing, the sole FIGURE of which shows as follows:
FIG. 1 a circuit diagram illustrating the invention.

DETAILED DISCUSSION IN CONJUNCTION WITH THE DRAWINGS

FIG. 1 shows a preferred form of embodiment of the circuit arrangement of the invention for reducing power loss in the case of an active electrical current output 5 of a 4-conductor field device. The circuit arrangement is part of the electronics of the field device. Preferably involved is one of the field devices mentioned above.

The circuit arrangement 1 shown in FIG. 1 is part of a four-conductor field device (not illustrated in detail). Via the input 2, the circuit arrangement 1 is supplied with a constant voltage. The voltage delivered from the external voltage supply 3 is, for example, 24V. The constant voltage provided by the voltage supply 3 is converted via the voltage regulator into a lower voltage, which lies e.g. between 0-24V. The voltage regulator 4 preferably comprises a high efficiency, DC/DC converter.

Voltage regulator 4 is connected with the electrical current output 5 of the field device. Connected to the electrical current output 5 is an external load 6, e.g. a display unit. The signal output 5 is connected with an electrical current controller 7, especially a transistor, which in turn is connected via a reference resistor 8 to a reference potential, especially ground. Between the electrical current controller 7 and the reference resistor 8, an analog-digital converter 9 taps the voltage applied to the reference resistor (8) and converts such voltage into a digital signal. This digital signal is forwarded to the microcontroller 10, which converts the voltage value using the known resistance value 8 into the presently flowing electrical current. The microcontroller 10 is connected, on the one hand, with the control terminal of the transistor 7 and, on the other hand, with the voltage regulator 4.

The circuit is based on the idea of so lessening the voltage of, for example, 24 volts, provided by the voltage source 3 to the DC/DC converter 4 that the external load 6 receives only an actually required voltage necessary for establishing the electrical current value representing as output signal the present value of the process variable of the field device. Due to this pretuning of the voltage by the voltage regulator 4, the electrical current controller 7 then needs to destroy only a possibly still present energy excess, in order to fine tune to the correct electrical current value.

The electrical current value required for output to the external load 6 is set, in such case, via the electrical current controller 7. In order to be able to tune the electrical current value sufficiently exactly, the voltage on the resistor 8 connected on the other side to ground is measured by means of the analog-digital converter 9. The analog-digital converter 9 converts this measured analog voltage into a digital value and forwards this to the microcontroller 10. The microcontroller 10 calculates based on the digital value a current value of the manipulated variable for supply to the control electrode of the electrical current controller embodied as transistor 7 for fine tuning to the correct electrical current value.

After turn-on of the field device, the internal resistance of the external load 6 is calculated, at least approximately. If the process variable changes, so that a corresponding electrical current value must be set, the calculated internal resistance is used to select the most suitable voltage step. For this, the voltage regulator 4 converts the voltage delivered by the voltage supply 3 into the voltage ascertained by the computation/control unit 10. Thus, there lies on the external load 6 a voltage, which enables the electrical current controller 7 to set the electrical current value determined via the internal resistance of the load 6 and to minimize power loss at the electrical current controller 7.

If, during operation, the resistance value of the reference resistor 8 changes—, for example, through supplemental connecting of a HART handheld—tuning to the correct electrical current value occurs via an iterative process. For this, the voltage is successively increased—e.g. in voltage steps—until the correct electrical current value is approximately set. Since the voltage regulator 4 embodied as a DC/DC converter has a high efficiency, for example, 85%, the power loss is correspondingly small. In this way, heat loading of the circuit arrangement 1 is small.

The electrical current controller 7 forms together with the reference resistor 8, the analog-digital converter 9 and the microcontroller 10 a control loop, which enables fine tuning of the electrical current value output to the external load 6. Thus, it is possible to provide to the external load 6 an output signal in the form of an electrical current value, in the case of which the quality of the control loop is combined with the voltage reducing effect of the voltage regulator 4.

A further advantage of the circuit arrangement 1 is that a malfunction, especially an overload, a line break or a wiring fault, can be recognized. In the case of an arising malfunction, the voltage regulator 4 shuts the signal output 5 down.

An overload arises when the internal resistance of the external load 6 is so small that the required electrical current can no longer be provided via the voltage regulator 4. The overload is detected via the electrical current, which is calculated by the computation/control unit 10 from the tapped voltage at the reference resistor 8 and the known resistance value of the reference resistor 8. The overload is thus recognized when the desired electrical current value cannot be set via the electrical current controller 7, even though the voltage regulator 4 is already delivering the maximum required voltage. Advantageous is that the external load 6 can be checked, without having to set the maximum electrical current value.

The field device can, moreover, be so embodied that it issues a warning, when the external load 6 is too high or is not connected to the signal output 5. Likewise, a line break can be signaled.

In an embodiment, the electrical current output is modulated with a HART signal.

The invention claimed is:

1. A circuit arrangement for reducing power loss in the case of an active electrical current output of a field device for determining and/or influencing a process variable, said electrical current output being connected with an external load and said process variable being represented via a selectable electrical current value, said circuit arrangement comprising:
an external voltage supply;
a voltage regulator for converting a voltage delivered by an external voltage supply into a lower voltage; and
a control loop associated with said voltage regulator,
said external load being coupled with the voltage regulator,
said control loop including: an electrical current controller for setting the electrical current value, an analog-digital converter, a computation/control unit and a reference resistor, which is connected in series with said electrical current controller and to a reference potential, said computation/control unit being coupled with said voltage regulator and with said analog-digital converter, and said analog-digital converter being adapted to measure a voltage applied to the reference resistor, to digitize the measured voltage and to forward the digital voltage value to said computation/control unit;
wherein: the computation/control unit is adapted to calculate a voltage to be delivered by the voltage regulator based on: said measured voltage forwarded by the analog-digital converter, a known resistance value of the reference resistor and the electrical current value currently to be set, and to operate the electrical current controller for setting the electrical current value and to operate the voltage regulator for tuning the voltage delivered by the voltage regulator as a function of the presently set electrical current value,
and the control loop is so embodied that the voltage regulator, as a function of the presently set electrical current value, controls the voltage delivered.

2. The circuit arrangement as claimed in claim 1, wherein: said control loop controls said voltage regulator in predetermined voltage steps.

3. The circuit arrangement as claimed in claim 1, wherein: the electrical current controller comprises a transistor.

4. The circuit arrangement as claimed in claim 1, wherein: said voltage regulator is adapted to convert a voltage provided by the external voltage supply into a lower voltage between 0-24 V.

5. The circuit arrangement as claimed in claim 1, wherein: said voltage regulator comprises a DC/DC converter.

6. The circuit arrangement as claimed in claim 1, wherein: the voltage regulator is adapted to turn said electrical current output off for the case, in which a malfunction occurs, which is selected from: an overload at said external load, an interruption of the electrical current supply to said external load and a wiring fault at the signal output of the field device.

7. The circuit arrangement as claimed in claim 6, wherein: said computation/control unit detects the malfunction by noting that said electrical current controller cannot set an electrical current value corresponding to the process variable, even though the voltage regulator is delivering the maximum required voltage.

8. A field device for registering a process variable, said field device comprising: a circuit arrangement as claimed in claim 1, wherein:
an electrical current value lying between 4 mA and 20 mA represents the process variable.

9. The field device as claimed in claim 8, wherein:
an electrical current value below 4 mA is used for transmitting an alarm state.

10. The field device as claimed in claim 8, wherein:
an electrical current value above 20 mA is used for transmitting an alarm state.

11. The field device as claimed in claim 8, selected from a group consisting of:
flow measuring devices, fill level measuring devices, pressure and temperature measuring devices, pH measuring devices, and conductivity measuring devices.

12. A circuit arrangement for reducing power loss in the case of an active electrical current output of a field device for determining and/or influencing a process variable, said electrical current output being connected with an external load and said process variable being represented via a selectable electrical current value, said circuit arrangement comprising:
a voltage regulator for converting a voltage delivered by an external voltage supply into a lower voltage, said voltage regulator being coupled to the external load; and
a control loop associated with said voltage regulator, wherein:
the control loop includes a computation/control unit, which is coupled with said voltage regulator and which is adapted to calculate a voltage required by the load for setting the electrical current value and to operate the voltage regulator for tuning the voltage delivered by the voltage regulator as a function of the presently set electrical current value.

13. A field device for registering a process variable, said field device comprising: a circuit arrangement as claimed in claim 12, wherein:
an electrical current value lying between 4 mA and 20 mA represents the process variable.

14. The field device as claimed in claim 13, wherein:
an electrical current value below 4 mA is used for transmitting an alarm state.

15. The field device as claimed in claim 13, wherein:
an electrical current value above 20 mA is used for transmitting an alarm state.

16. The field device as claimed in claim 13, selected from a group consisting of:
flow measuring devices, fill level measuring devices, pressure and temperature measuring devices, pH measuring devices, and conductivity measuring devices.

* * * * *